Aug. 10, 1948.  E. T. CAMERON  2,446,573
SUCTION FEEDER
Filed Aug. 30, 1946  2 Sheets-Sheet 1

Inventor
EMMETT T. CAMERON
By McMorrow, Berman & Davidson
Attorneys

Aug. 10, 1948.  E. T. CAMERON  2,446,573
SUCTION FEEDER
Filed Aug. 30, 1946  2 Sheets-Sheet 2
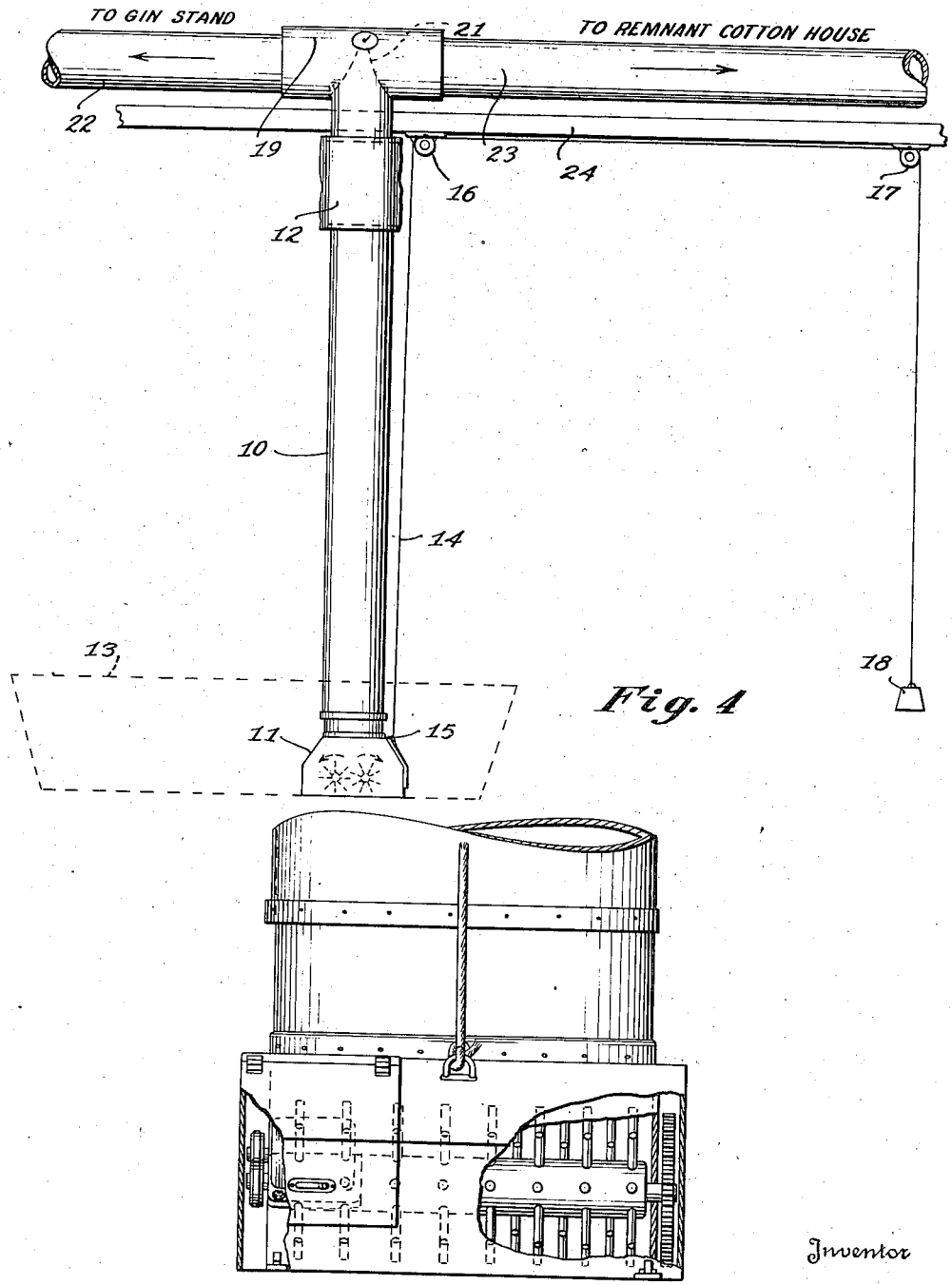

Patented Aug. 10, 1948

2,446,573

UNITED STATES PATENT OFFICE 2,446,573

SUCTION FEEDER

Emmett T. Cameron, San Antonio, Tex.

Application August 30, 1946, Serial No. 693,960

3 Claims. (Cl. 302—58)

1

This invention relates to a suction feeder for unloading wagon loads of cotton and delivering the cotton to the gin or to a remnant cotton house.

It is an object of the invention to provide in a suction-type feeder for cotton an agitator adapted to move the cotton being picked up toward the center of the air suction blast so that it will be drawn quickly into the suction pipe.

It is another object of the invention to speed up the time for unloading a cotton load and to eliminate the necessity for a man to effect forking the cotton to the feeder as in the case of the old-type feeders.

It is another object of the invention to eliminate so far as possible the drawing into the gin of rocks, straws and other foreign matter.

It is still another object of the invention to provide a suction feeder of a type adapted to be dipped into the cotton load wherein the gearing for driving the agitator devices and the motor with its drive is confined to compartments separate from the agitating reels or spikes and so that it will not be clogged with the cotton entering the cotton chute or be stained with grease from the gearing and the motor drive mechanism.

For other objects of the invention and for a better understanding of the invention, reference may be had to the following detailed description taken in connection with the accompanying drawings, in which:

Figure 3 is a side elevational view of the lower end of the suction feeder and looking upon the door to the compartment containing the motor and with portions broken away to show the drive connections with the opposite ends of the spiked reel.

Figure 4 is a diagrammatic view of a suction feeder as it is hooked up for use in drawing cotton out of a wagon and showing the tubing for conveying the sucked-up cotton to the gin or to the remnant cotton house, depending upon the position of a valve within the tubing, or more specifically, within a T connection therein.

Figure 1:
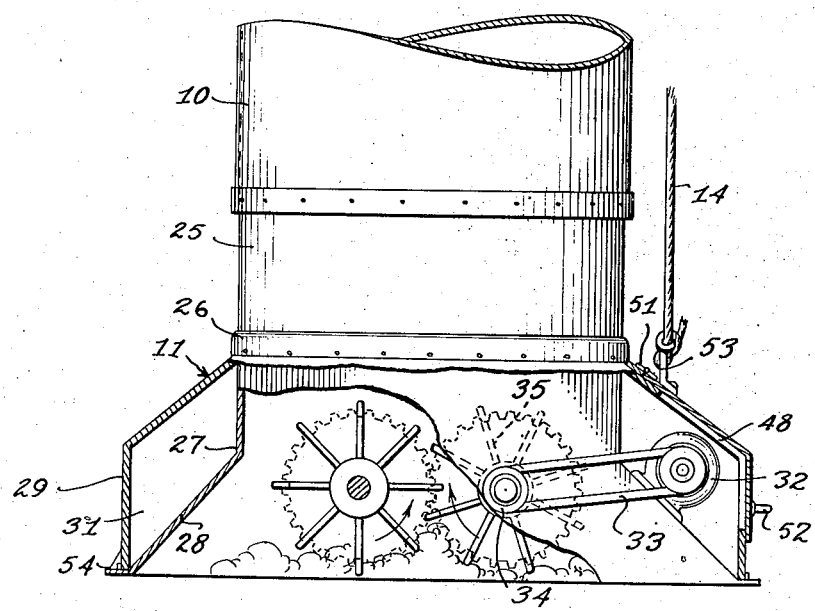
Figure 1 is a fragmentary view of the lower end of the chute with portions broken away to show the drive mechanism and the agitating spikes.
Figure 2:
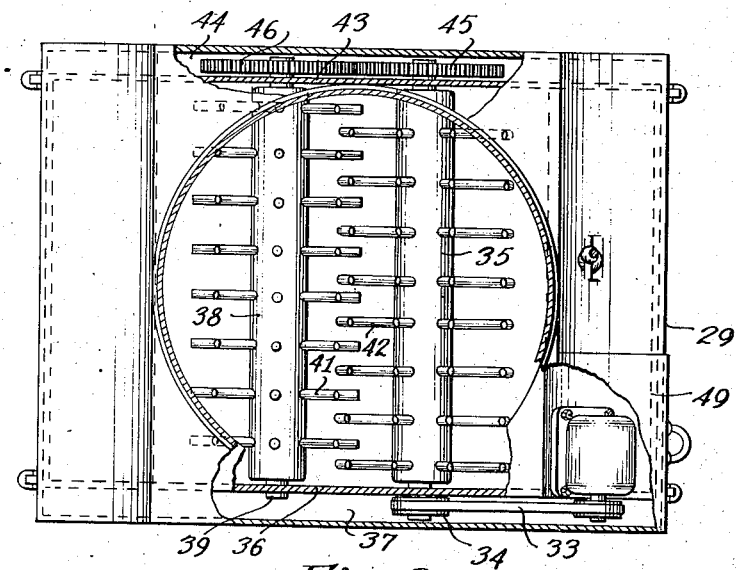
Figure 2 is a top plan view of the lower end of the chute with part of the tubing having been removed therefrom and looking downwardly upon the agitating spiked reels, portions of the casing being broken away to show the motor drive and the interconnecting gears of the respective spiked reels.

Referring now to the figures, 10 is a depending

2 chute having a suction feeder device 11 on its lower end embodying the features of the present invention. The upper end of the chute is slidable in a bracket 12 connected to a building or other support whereby the chute and the feeder can be drawn upwardly out of or lowered into a wagon 13 by means of a rope 14 connected with the suction feeder 11, as indicated at 15, and extended upwardly over a pulley 16 and then forwardly and down over a pulley 17 for connection with a handle 18 by which a man standing on the ground can lift the suction feeder from the wagon. The upper end of the chute 10 has connected to it a T-connection 19 containing a valve 21 which can be positioned to one side or the other of chute 10 to direct the cotton either to a cotton gin through a tube 22 or to a remnant cotton house through a tube 23. The pulleys 16 and 17 are supported from a beam 24.

The suction feeder 11 has a tube 25 which is slidable into and out of the chute 10. As the rope 14 is pulled upwardly, the feeder 11 is slid into the chute 10 until a band or shoulder 26 engages the lower end of the chute 10 and thereafter the chute 10 will be lifted along with the feeder.

The tube 25 of the feeder extends downwardly to a point 27 and is flared outwardly, as indicated at 28, to provide a mouth-receiving portion for the cotton. Surrounding the lower end of the tube 25 is an outer casing 29 providing for a space 31 between the tube and the casing. The outer casing may be a continuation of the band or collar 26 and integral therewith. Within this space 31 and at one side, there is located an electric motor 32 having a drive belt 33 connecting with a pulley 34 of a spiked reel 35 having its ends journaled in a partition wall 36 at one side of the feeder to provide space 37 for the belt 33 and the pulleys with which it is connected. A second spiked reel 38 is also journaled in the partition wall, as indicated at 39, and has spiked teeth 41 which extend into spaces between spiked teeth 42 of the reel 35.

At the opposite side of the feeder the spiked reels 35 and 38 are journaled in a partition wall 43 corresponding to the partition wall 36 at the opposite side of the feeder and providing for a space 44 in which to house interconnected gears 45 and 46 of the respective spiked reels 35 and 38. By driving the spiked reel 35 with the belt 33, the spiked reel 38 will be driven through the gears 45 and 46, but in the reverse direction whereby the spikes will tend to draw the cotton toward the center of the feeder and into the chute thereof where the suction draft is of maximum pressure.

In the wall or casing 29 at the motor side of the feeder, there is provided an access opening 48 through which access can be gained to the motor. A cover 49 extends down over this opening and is hinged to the casing 29, as indicated at 51. A handle 52 is provided on the cover to lift the same. A loop 53 is provided on the casing 29 to provide means to which the rope 14 can be attached to the suction feeder. The spiked teeth extend downwardly to close the lower edge of the flared mouth portion 28 and the lower edge of the outer casing 29.

Feet portions 54 are provided on the outer casing 29 to protect the lower edges of the casing.

While various changes may be made in the detailed construction, it shall be understood that such changes will be within the spirit and scope of the present invention as defined by the appended claims.

I claim:

1. A suction feeder for cotton chutes comprising a tube having a flared bottom mouth portion, an outer casing surrounding a part of the tube and the mouth portion thereof and providing a space or closed compartment, partition walls extending between opposite ends of the mouth portion and the outer casing, two spiked reels journaled between the partition walls, the spikes of one reel being staggered longitudinally with respect to the spikes of the other reel, said reels being spaced from each other to an extent such that the spikes of the one reel extend into the spaces between the spikes of the other reel, and drive mechanism for rotating the spiked reels in opposite directions to pick upwardly and direct toward the center of the chute cotton registering with the mouth opening of the chute, said drive mechanism including an electric motor confined within the compartment provided between the outer casing and the tube.

2. A suction feeder for cotton chutes comprising a tube having a flared bottom mouth portion, an outer casing surrounding a part of the tube and the mouth portion thereof and providing a space or closed compartment, partition walls extending between opposite ends of the mouth portion and the outer casing, two spiked reels journaled between the partition walls, the spikes of one reel being staggered longitudinally with respect to the spikes of the other reel, said reels being spaced from each other to an extent such that the spikes of the one reel extend into the spaces between the spikes of the other reel, and drive mechanism for rotating the spiked reels in opposite directions to pick upwardly and direct toward the center of the chute cotton registering with the mouth opening of the chute, said drive mechanism including an electric motor confined within the compartment provided between the outer casing and the tube, said outer casing having portions lying alongside the partition wall whereby to provide faces at opposite sides of the suction feeder for the confinement of portions of the drive mechanism.

3. A suction feeder for cotton chutes comprising a tube having a flared bottom mouth portion, an outer casing surrounding a part of the tube and the mouth portion thereof and providing a space or closed compartment, partition walls extending between opposite ends of the mouth portion and the outer casing, two spiked reels journaled between the partition walls, the spikes of one reel being staggered longitudinally with respect to the spikes of the other reel, said reels being spaced from each other to an extent such that the spikes of the one reel extend into the spaces between the spikes of the other reel, and drive mechanism for rotating the spiked reels in opposite directions to pick upwardly and direct toward the center of the chute cotton registering with the mouth opening of the chute, said drive mechanism including an electric motor confined within the compartment provided between the outer casing and the tube, said outer casing having an opening by which access can be gained to the electric motor within the compartment, and a cover on the outer casing adapted to be brought over the opening to close the same.

EMMETT T. CAMERON.

REFERENCES CITED

The following references are of record in the file of this patent:

UNITED STATES PATENTS

| Number | Name | Date |
| --- | --- | --- |
| 1,400,658 | Brown | Dec. 20, 1921 |